MATTHEW J. MASEM,
INVENTOR

BY [signature]
ATTORNEY

July 15, 1958 M. J. MASEM 2,843,688

TAPE CONTROLLED APPARATUS

Filed Sept. 4, 1956 2 Sheets-Sheet 2

MATTHEW J. MASEM,
INVENTOR.

BY [signature]
ATTORNEY

United States Patent Office 2,843,688

Patented July 15, 1958

2,843,688

TAPE CONTROLLED APPARATUS

Matthew J. Masem, La Mirada, Calif., assignor to Hughes Aircraft Company, Culver City, Calif., a corporation of Delaware Application September 4, 1956, Serial No. 607,623

5 Claims. (Cl. 200—61.15)

This invention relates generally to tape handling apparatus and in one of its aspects to a switching arrangement controlled by the tape.

The invention is applicable in a variety of different arrangements wherein information contained by a tape is to be viewed or utilized in controlling a physical condition. An application falling in the latter category exists in the field of automatic controls wherein certain physical conditions are to be controlled in dependence of information contained in the tape. For example, in the field of automatic machine tool control utilizing digital techniques, a punched paper tape is usually employed to program the operation of a machine tool or a line of machine tools. Such applications usually require a facility providing for re-using or rereading a predetermined portion of the tape, for example, a given message portion of the tape. Thus, it is desirable that the apparatus handling the tape be arranged so that a particular message portion of the tape may be rewound and thereafter reread so that the given machine operation may be repeated. It should be noted at this point that the tape employed for programming the operation of the machine need not be a punched tape but may be any one of the types which are conventionally available for this purpose. However, this discussion and the disclosure which follows will be concerned primarily with the punched type of tape solely for the purpose of convenience.

The tape handling apparatus for a punched paper tape utilized to program and control a machine tool operation usually involves a motor-driven supply reel and a motor-driven take-up reel with a tape reading station therebetween, the tape being fed from the supply reel through the tape reading station to the take-up reel where the tape coming from the reader is taken up. If the machine operations are to be repeated, provision must be made in this arrangement for rewinding the message portion which has been read. In one embodiment of this invention, the intelligence for this operation is derived from the tape wherein suitable tape coding is provided to indicate the end of the message. This information is utilized to reverse the motors controlling the supply and take-up reel to rewind the tape. Provision is also made to control the amount of rewind so that once the complete message has passed in the reverse direction through the reader, the rewind operation may be stopped and the system restored to feed the tape in a forward direction through the tape reader.

This can be done by utilizing additional holes in the tape indicating the start of the message, which may be read by the reader if desired, but to improve the rewind speed is preferably read by a separate switching device controlled by holes in the tape adjacent to the beginning of the message. The signals derived from the switching device are then utilized to stop the rewind and at least partially re-establish circuits for running the reel motors in the forward tape feeding direction.

This provides a relatively closely controllable rewind facility but has the distinct disadvantage of requiring rather large holes to be punched in the tape adjacent the beginning of the message. This permanently fixes the rewind points which limits flexibility with respect to rewind and because of the size of the holes required tends to weaken the tape.

These disadvantages may be obviated through the provision of a tape operated switching arrangement located at one of the reels. A device of this type may be adjusted with respect to the tape so that any selected portion of the tape may be rewound.

Accordingly, one object of this invention is to provide an apparatus for controlling the handling of a coded information tape, which is controlled by the tape.

Another object of this invention is to provide a tape reel drive utilizing a switching device for initiating rewinding of the tape, wherein said switching device is disposable at different points along the tape to provide rewinding of any selected portion of the tape.

A specific object of this invention is to provide a switching device applicable in a system of the character generally referred to in the preceding object and embodying a tape controlled switch member associated with a tape reel for movement angularly and radially with respect to said reel.

The foregoing statements are merely illustrative of the various aims and objects of this invention. Other objects and advantages will become apparent from a study of the following specification when considered in conjunction with the accompanying drawings wherein.

In a machine tool control, whether involving one or more machines which are to be controlled by information contained in a particular tape, it is usually necessary to rewind the tape and then start the tape in the forward reading direction so that the machine operations may be repeated on a succeeding part which is to be machined. Operations of this type are usually performed at high speed and the information on the tape is usually contained in information blocks having a short space therebetween. The switch arrangements of this invention may be utilized to select any particular block of information which it is desired to rewind and thereafter reread. Thus, the arrangement utilizes a switching member located at one of the tape reels, which is adjustable with respect to the tape that is being rewound on the reel so that substantially any linear position along the tape may be selected as the control point toward terminating a rewind operation.

Figure 1:
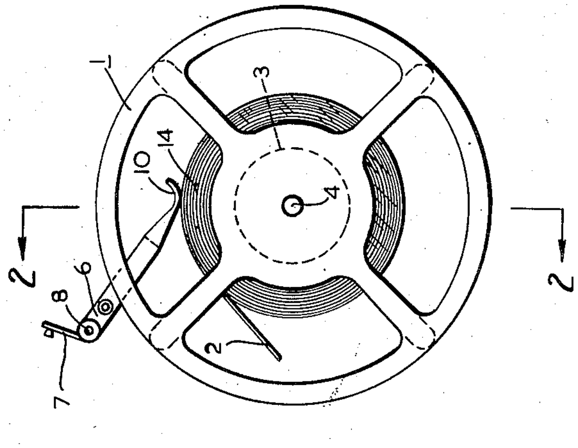
Fig. 1 is an elevational view of a tape controlled switch arrangement embodying the principles of this invention.

In Fig. 1, the arrangement simply comprises a reel 1 which may be either a supply reel or a take-up reel in a system of the type hereinabove generally described. Tape 2 is wound upon spool 3 on the reel. For this purpose, provision may be made for rotating the reel. In one embodiment of this invention, reel 1 is mounted upon a motor-driven shaft 4 which is suitably journaled in a support 5. The switch assembly includes an arm 6 which is spring loaded by means of a torsion spring 7. The arm 6 is pivotally mounted on a shaft 8 which is mounted on the support 5. Arm 6 constitutes one contact element of the switch and may be formed of a thin strip of electrical conducting material, such as, Phosphor bronze and shaped so that its contact end 10 terminates in a curved section adapted to resiliently engage and ride the surface of tape on the reel 1. A flexible lead 11 between contact arm 6 and a terminal 12 in support 5 connects with a lead 13 to provide electrical connection with the contact arm.

Figure 2:
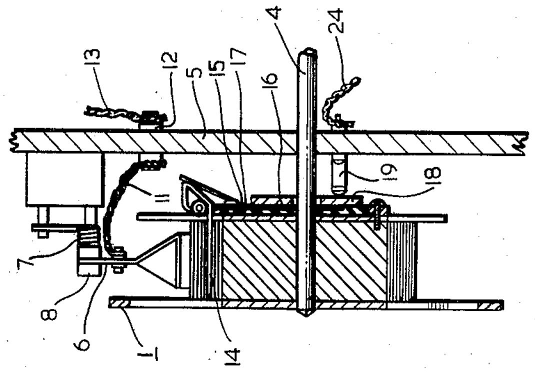
Fig. 2 is a sectional view taken on the line 2—2 of Fig. 1.
Figure 4:
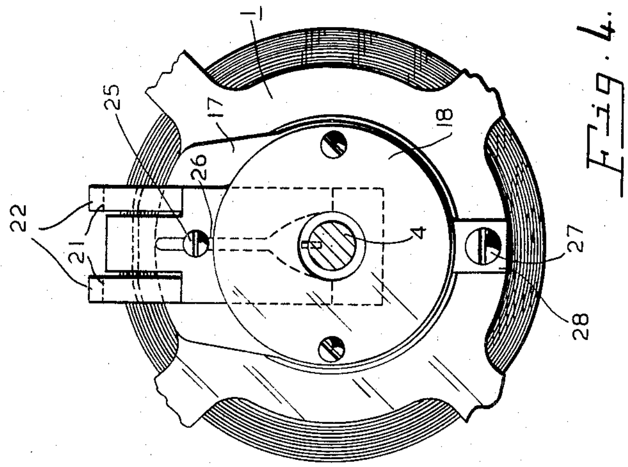
Fig. 4 is a view taken on the line 4—4 of Fig. 3.
Figure 3:
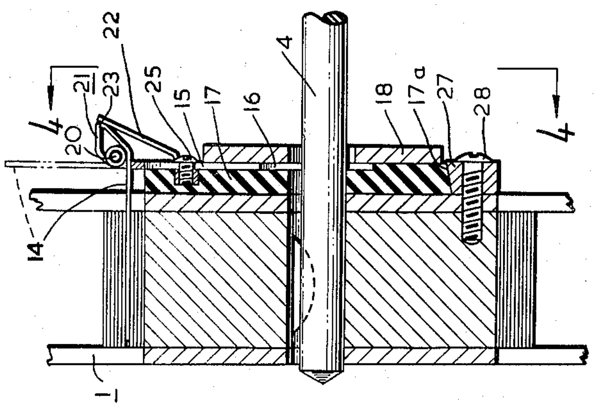
Fig. 3 is an enlarged fragmentary sectional view of the switch arrangement illustrated in Fig. 2.

The other contact element of this switch assembly includes an adjustable contact member 14, as seen in Figs. 2 and 3. This contact member is pivotally mounted on the end of a contact support 15 which is slidably mounted in a radial surface slot 16 in the surface of an insulating plate 17 which is rotatably mounted about shaft 4 at one side of the reel 1. A slip ring 18 is concentrically disposed with respect to the shaft 4 on the surface of the insulating disc 17 and in this position contacts the contact support 15. The upper end of contact support 15, as seen in Figs. 2, 3 and 4, conventionally mounts a pin 20, which, referring to Fig. 4, extends beyond the lateral margins of the pin mount to receive the bifurcated bearing end of contact member 14 providing a stable, positive bearing mount for this contact member.

As will be seen by reference to Fig. 3, contact member 14 is provided with a cam shaped arrangement 21, shaped from the sheet metal from which the contact is formed and which is engaged by means of spring member 22. Fig. 4 shows a double cam and spring arrangement. This may be utilized to distribute the loads. Spring members 22 may be shaped from the contact support 15 as illustrated or they may form part of a separately attached spring biasing arrangement, such arrangements being conventional.

Cam shaped member 21 is provided with a high point at 23 which, as seen in Fig. 3, is displaced above and to the right of the axis of pivot pin 20. Since the spring loads are applied from right to left as viewed, this applies a counter-clockwise torque to contact member 14 about the pivot axis, biasing the contact member into engagement with the tape. This is a relatively light bias. In the applications for which this device is intended, the speed of operation of the reels, while fast for the considerations involved, is not sufficient to generate excessive centrifugal forces with respect to the arm 14. Thus, the normal bias will only be sufficient to overcome normal centrifugal forces, if necessary, but in any case will be sufficiently light that if the tape is to be wound past the contact 14 the tape may throw the contact to one side to the dotted position indicated wherein the contact member 14 substantially parallels the side of the reel and is completely clear of the tape. In this second position, the cam member is so shaped that a light bias is provided to hold the contact member 14 against unwanted movement. With the arrangement provided, contact member 14 is effectively toggled into each of its two positions and the means whereby this is accomplished represents but one of numerous conventional ways of accomplishing this type of bias.

Contact support 15 makes electrical contact with slip ring 18 which in turn is engaged by a slip ring brush 19 insulatedly mounted on support 5. Slip ring brush 19 connects with a lead 24. Whenever the tape is unwound to expose contact member 14, contact portion 10 engages contact member 14 to complete a circuit between conductors 13 and 24 thereby providing a signal indicating that the rewind operation, or, unwind operation, as the case may be, of the tape must be stopped. To afford flexibility in selecting the point along the tape at which this control is to take place the contact member 14 is radially adjustable with respect to the reel by reason of its mounting in the slot 16 of insulating plate 17. Radial adjustment is simply achievable by loosening a single screw 25 which clears through a slot 26 in the contact support 15 whereafter the contact support 15 may be adjusted radially in the slot 16 and secured in any desired radial position within the adjusting limits of the assembly. Thus, the contact member 14 may be radially displaced to be selectively inserted between adjacent layers of tape on the spool during the period in which tape is being wound thereon. This affords a reasonably accurate selection of a point at which the tape operation is to be changed, that is, for winding or rewinding. However, some applications may require still further accuracy in selecting a particular point along the tape. This selection may be controlled somewhat by adjusting the angular position of the reel with respect to the tape when the winding operation is begun; however, this is awkward and if a large amount of tape is involved is essentially unpredictable. A better arrangement is provided herein by permitting angular adjustment between insulating plate 17 and reel 1. This is accomplished by sloping a peripheral surface of the plate 17 as indicated in Fig. 3 at **17*a* and utilizing a wedge clamp 27 secured by a screw 28 to lock or to release insulating plate 17 so that this angular adjustment may be made and secured. As shown in Fig. 4, this adjustment may be approximately of the order of 270 degrees although careful design could increase this figure materially. Thus, once a particular layer of tape has been selected, further angular rotation moves the contact member 14** to a desired linear position with respect to the tape so that the tape handling operation may be controlled with reasonable exactness.

Figure 5:
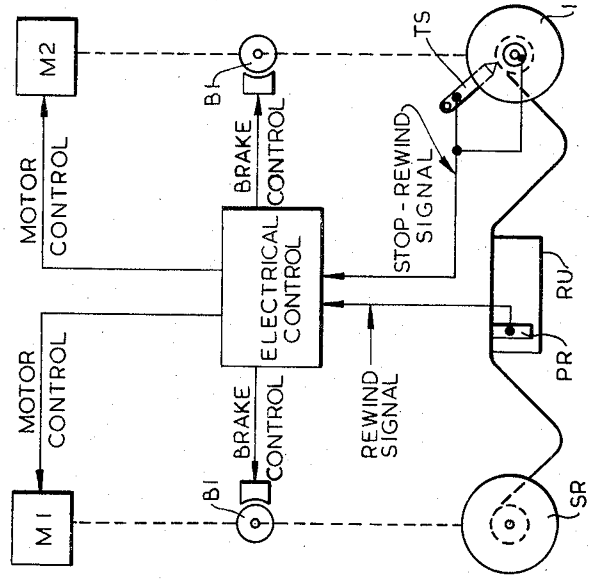
Fig. 5 is a diagrammatical illustration of a tape handling apparatus embodying the principles of this invention.

The application of this invention in a tape handling system is illustrated in Fig. 5 wherein the tape is supplied from a motor-driven supply reel SR to a reader unit RU and tape passing from the reader unit is wound up on the take-up reel 1. Respective motors M1 and M2 drive the supply and take-up reels. These motors are controlled by respective electromagnetically applied and spring released brakes B1 and B2 having brake wheels secured to the respective motor shafts and brake shoes controlled by the electromagnetic control associated therewith. An electronic control unit EC indicated only in block form, which includes conventional relay circuitry, is utilized to control the respective motors and brakes in dependence of signals received from the tape controlled switch TS, hereinabove generally described, and from a pin reader section PR of the reader unit. While not herein illustrated, the reader unit includes an incremental drive for a sprocket wheel which engages the tape and incrementally feeds the tape past the pin reader station, the movements of the pin reader station PR being synchronized with the incremental sprocket wheel operation so that the pin reader is applied to the tape in the brief intervals during which the incremental tape drive is stationary and the tape is at a standstill. A system of this general nature is disclosed in a co-pending application of William F. Daley and James P. Norton, Serial No. 606,354, filed August 27, 1956, entitled Perforated Tape Reader, and assigned to the assignee of this invention, which may be referred to for details not herein illustrated.

Normally, the motors M1 and M2 are energized for feeding the tape in the forward reading direction which is from right to left, as viewed in Fig. 5, in which case both reels rotate in clockwise directions. Contact member 14 is disposed at a particular point along the tape at the take-up reel 1 as previously described corresponding, for example, to a tape position in which the beginning of the tape message which is to be read is adjacent the left side of the pin reading station PR. The message is then read in the forward direction with the motors M1 and M2 energized and controlled to maintain the indicated loops in the tape at the entrance and exit sides of the tape reader unit RU, the tape being fed through the unit by the previously mentioned incremental sprocket wheel drive. The end of the message is detected by the pin reader station PR, this being indicated by suitable coded perforations in the tape. The signal produced by the pin reader station at this time is applied to the electrical control arrangement EC which de-energizes and reverses the connection for the motors M1 and M2 and at the same time energizes the brakes to stop the motors and reels. Thereafter, the motors operate in the reverse direction rewinding the tape. During this interval provision may be made in the reader unit to disconnect the incremental sprocket wheel drive to permit free wheeling of the sprocket wheel in the reverse direction to minimize tape drag, the power for tape rewind being supplied by the motor M1 with motor M2 following to minimize tape drag and tension.

When sufficient tape has been rewound, contact member 14 on take-up reel 1 is exposed and makes contact with the contact arm 6, closing a circuit in the electronic control EC which de-energizes the motors and restores the connections of the motors for forward tape operation. During this interval again, the brakes may be applied to stop the reels to prevent excessive overrun. The system may be arranged for immediate re-starting in the forward feed direction in dependence of the control signal derived at switch TS or may be maintained temporarily de-energized until the part to be machined is properly positioned in the machine tool assembly.

It will be appreciated that the switch arrangement herein disclosed facilitates the tape handling problem in systems of this general nature and provides a positive and durable type of arrangement having long life and providing flexibility of adjustment with respect to the tape, so that any selected portions of the tape may be rewound independently of markings required by previous arrangement on the tape itself. Thus, the space normally utilized in the tape for rewind indications is available for additional information for more important purposes and the necessity in perforated tape arrangements for large holes which may materially weaken the tape and thereby reduce its life expectancy is eliminated.

Although but one embodiment of this invention has been herein illustrated and described, it will be appreciated by those skilled in the art that the switch arrangement herein illustrated may be modified as to its specific details without departing from the spirit and scope of this invention and further that the organization of this invention may be varied in the sense that the switch may be applied selectively to either the supply or take-up reels as specific conditions may require.

What is claimed is:

1. A tape controlled switch assembly, comprising: a rotatably mounted tape reel; a movable, spring loaded contact member having a contact end disposed to engage and ride the surface of tape on said reel; a flat contact member pivotally mounted on said reel and swingable between two positions engaging and clearing said tape respectively; and a spring toggle mechanism connected with said flat contact member and spring loading said contact member in each of said positions.

2. A tape controlled switch assembly, comprising: a rotatably mounted tape reel; a movable, spring loaded contact member having a contact end disposed to engage and ride the surface of tape on said reel; a flat contact member pivotally mounted on said reel and swingable between two positions engaging and clearing said tape respectively, in said first position said flat contact member being adapted to be wrapped between selected adjacent turns of said tape, a cam mounted on said flat contact member to move therewith; a spring member resiliently riding against said cam and through said cam applying torques which bias said flat contact member selectively toward said first named and second named positions from a given intermediate position.

3. A tape controlled switch assembly, comprising: a rotatably mounted tape reel; a movable, spring loaded contact member having a contact end disposed to engage and ride the surface of tape on said reel; a flat contact member, pivot means mounted on said reel, pivotally mounting said flat contact member for movement between a first position extending axially of said reel and a second position extending substantially radially of said reel at one side thereof; in said first named position said flat contact member being adapted to be wound between adjacent turns of said tape; and spring loaded means connected with said flat contact member, providing restraining biases in each of said two named positions.

4. A tape controlled switch assembly, comprising: a rotatably mounted tape reel; a movable, spring loaded contact member having a contact end disposed to engage and ride the surface of tape on said reel; a flat contact member, pivot means mounted on said reel, pivotally mounting said flat contact member for movement between a first position extending axially of said reel and a second position extending substantially radially of said reel at one side thereof; in said first named position said flat contact member being adapted to be wound between adjacent turns of said tape; spring loaded means connected with said flat contact member, providing restraining biases in each of said two named positions; a cam mounted to rotate with said flat contact member about the axis of said pivot means and having a prominent cam surface displaced angularly from the plane of said flat contact member, and a spring loaded member riding against said cam surface and being effective through said cam to apply restraining torques to said flat contact member in each of said two named positions.

5. A tape controlled switch assembly, comprising: a rotatably mounted tape reel; a movable resiliently biased contact member having a contact end disposed to engage and ride the surface of tape on said reel; a flat contact member pivotally mounted on said reel and swingable between two positions engaging and clearing said tape respectively; and a resilient toggle mechanism connected with said flat contact member and resiliently loading said contact member in each of said two positions.

References Cited in the file of this patent

UNITED STATES PATENTS

| | | |
|---|---|---|
| 1,378,887 | Martin | May 24, 1921 |
| 1,828,569 | Kellogg | Oct. 20, 1931 |
| 1,869,678 | Fenner et al. | Aug. 2, 1932 |
| 2,227,303 | Flaws | Dec. 31, 1940 |
| 2,507,078 | Wright | May 9, 1950 |
| 2,584,734 | Owens | Feb. 5, 1952 |
| 2,683,568 | Lindsay | July 13, 1954 |